(12) United States Patent
Matsko et al.

(10) Patent No.: US 7,570,850 B1
(45) Date of Patent: Aug. 4, 2009

(54) WGM RESONATORS FOR STUDYING ORBITAL ANGULAR MOMENTUM OF A PHOTON, AND METHODS

(75) Inventors: Andrey B. Matsko, Pasadena, CA (US); Anatoliy A. Savchenkov, Glendale, CA (US); Lute Maleki, Pasadena, CA (US); Dmitry V. Strekalov, Arcadia, CA (US)

(73) Assignee: The United States of America as represented by the National Aeronautics and Space Administration, Washington, DC (US)

( * ) Notice: Subject to any disclaimer, the term of this patent is extended or adjusted under 35 U.S.C. 154(b) by 297 days.

(21) Appl. No.: 11/424,916

(22) Filed: Jun. 19, 2006

(51) Int. Cl.
*G02B 6/26* (2006.01)

(52) U.S. Cl. .............................. 385/30; 356/48; 385/15; 385/27; 385/32

(58) Field of Classification Search .................... 385/30
See application file for complete search history.

(56) References Cited

U.S. PATENT DOCUMENTS

| | | | |
|---|---|---|---|
| 6,583,399 B1 * | 6/2003 | Hunziker et al. | 250/214 R |
| 6,633,696 B1 * | 10/2003 | Vahala et al. | 385/27 |
| 6,859,582 B2 * | 2/2005 | Cai et al. | 385/30 |
| 6,978,067 B2 | 12/2005 | Herbert et al. | |
| 7,400,797 B2 * | 7/2008 | Bhagavatula et al. | 385/32 |
| 2005/0209788 A1 | 9/2005 | Mills | |
| 2006/0193557 A1 * | 8/2006 | Bradley et al. | 385/32 |

FOREIGN PATENT DOCUMENTS

WO    WO2007066253    *    6/2007

* cited by examiner

*Primary Examiner*—Frank G Font
*Assistant Examiner*—Eric Wong
(74) *Attorney, Agent, or Firm*—Mark Homer

(57) ABSTRACT

An optical system, device, and method that are capable of generating high-order Bessel beams and determining the orbital angular momentum of at least one of the photons of a Bessel beam are provided. The optical system and device include a tapered waveguide having an outer surface defined by a diameter that varies along a longitudinal axis of the waveguide from a first end to an opposing second end. The optical system and device include a resonator that is arranged in optical communication with the first end of the tapered waveguide such that an evanescent field emitted from (i) the waveguide can be coupled with the resonator, or (ii) the resonator can be coupled with the waveguide.

18 Claims, 3 Drawing Sheets

WGM RESONATORS FOR STUDYING ORBITAL ANGULAR MOMENTUM OF A PHOTON, AND METHODS

STATEMENT AS TO FEDERALLY-SPONSORED RESEARCH

The invention described herein was made in the performance of work under a NASA contract, and is subject to the provisions of Public Law 96-517 (U.S.C. 202) in which the Contractor has elected not to retain title.

FIELD OF THE INVENTION

The present teachings relate to an optical device and method that are capable of generating high-order Bessel beams and determining the orbital angular momentum of at least one of the photons of a Bessel beam. In particular, the present teachings relate to an optical device including a whispering gallery mode (WGM) resonator that is arranged in optical communication with a waveguide having a generally tapering outer surface.

BACKGROUND OF THE INVENTION

Currently, the capacity of transferring and processing information through space is limited by the number of bits that can be carried by a single photon in a light beam having a nonzero orbital angular momentum. Generally, the number of orthogonal states of the orbital angular momentum of a photon determines the number of bits that can be carried by the photon. However, generating, detecting, and studying high-order beams (e.g., Bessel beams with an orbital angular momentum that exceed $10^4$ h per photon) that could significantly increase the number of bits that can be carried by a single photon is not easily achievable.

Known techniques for studying orbital angular momentum of light beams include interferometric and holographic methods. These methods either require that many photons in the same state or are designed to study only a selected momentum state. The interferometric technique for measuring orbital angular momentum utilizes a series of cascaded Mach-Zehnder interferometers with rotating elements, such as Dove prisms. This technique classifies the incoming photons by their angular momentum and then directs the classified photons into their corresponding output ports. In the interferometric technique, however, the number of the cascaded Mach-Zehnder interferometers increases with the value of the maximum angular momentum of the photon. As a result, the need for a large number of interferometers for high-order Bessel beams makes this technique impractical.

Accordingly, a need exists for a system, device, and method to efficiently generate, detect, and study high-order Bessel beams. In particular, a need exists for a device that is capable of measuring both single photon and multiple-photon orbital angular momentum states.

SUMMARY OF THE INVENTION

The present teachings disclose an optical system and device, and methods related thereto, that are capable of (i) generating high-order Bessel beams, and (ii) determining the orbital angular momentum of at least one of the photons of the Bessel beam.

According to the present teachings, the optical system includes a waveguide having an outer surface defined by a diameter that varies along a longitudinal axis of the waveguide from a first end to an opposing second end. The first end of the waveguide defines a first diameter and the opposing second end of the waveguide defines a second diameter, which is larger than the first diameter. The optical system also includes a resonator arranged in optical communication with the first end of the waveguide such that an evanescent field emitted from one of the waveguide and the resonator is capable of being coupled into one of the other resonator and waveguide.

The present teachings also described an optical device including a waveguide portion including a first end defined by a first diameter, an opposing second end defined by a second diameter, and an outer surface substantially continuously tapering from the second end to the first end. The optical device also includes a whispering gallery mode resonator portion formed about the first end of the waveguide portion, such that the waveguide portion and the whispering gallery mode resonator portion form a unitary, one-piece optical waveguide structure.

According to the present teachings, a method of generating high-order Bessel beams in free space is provided. The method includes providing a waveguide including a first end defined by a first diameter, an opposing second end defined by a second diameter, and an outer surface tapering from the second end to the first end. The method also includes providing a whispering gallery mode resonator arranged at the first end of the waveguide. The method further includes coupling light to a mode of the whispering gallery mode resonator to produce a high-order Bessel beam in the whispering gallery mode resonator, transferring the high-order Bessel beam into the first end of the waveguide by emitting an evanescent field from the resonator, and extracting the high-order Bessel beam from the second end of the waveguide.

According to the present teachings, a method of determining orbital angular momentum of a photon is also provided. The method includes providing a waveguide including a first end defined by a first diameter, an opposing second end defined by a second diameter, and an outer surface tapering from the second end to the first end. The method also includes providing a whispering gallery mode resonator arranged at the first end of the waveguide. The method further includes introducing an existing Bessel beam including a plurality of photons having unknown characteristics into the second end of the waveguide, directing the Bessel beam from the second end of the waveguide to the first end of the waveguide, emitting an evanescent field generated by the Bessel beam from the first end of the waveguide and into the whispering gallery mode resonator, and determining the orbital angular momentum of at least one of the photons of the Bessel beam present in the evanescent field by ascertaining whether a frequency of the emitted evanescent field is supported by a mode of the whispering gallery mode resonator.

Additional features and advantages of various embodiments will be set forth, in part, in the description that follows, and, in part, will be apparent from the description, or may be learned by practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

The present teachings are directed to an optical device and system that are capable of generating Bessel beams and determining the orbital angular momentum of at least one of the photons of a Bessel beam. The present teachings are also directed to a method of generating high-order Bessel beams in free space, a method of determining orbital angular momentum of a photon, and a method of making an optical device. The optical device and system of the present teachings can generate and detect high-order Bessel beams with an orbital angular momentum exceeding $10^4$ h per photon, which has uses in the areas relating to, for example, optical tweezers, nonlinear optics, atom trapping, plasma physics, and quantum information transfer and processing.

Figure 1:
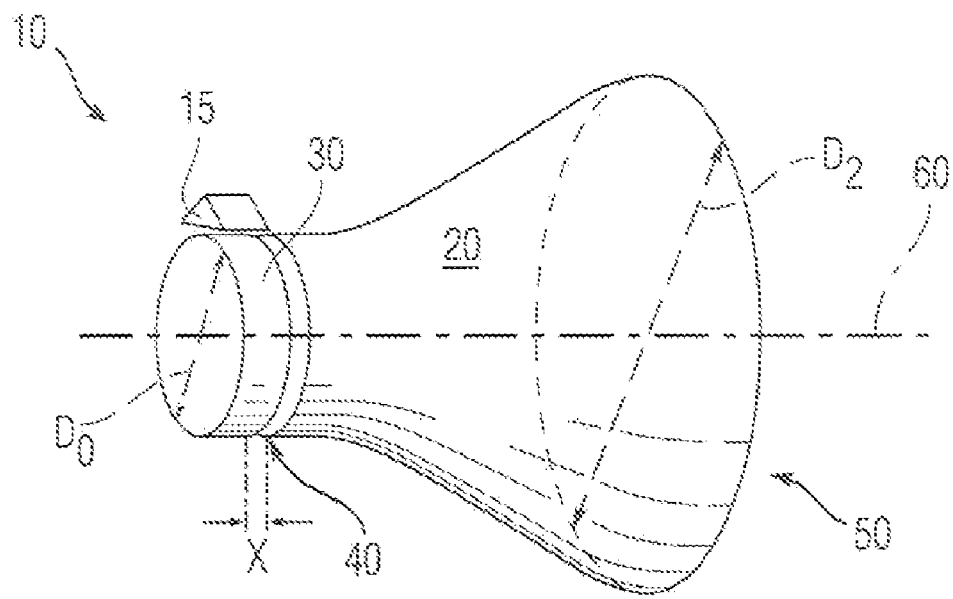
FIG. 1 is a perspective view of an optical system according to various embodiments.
Figure 2:
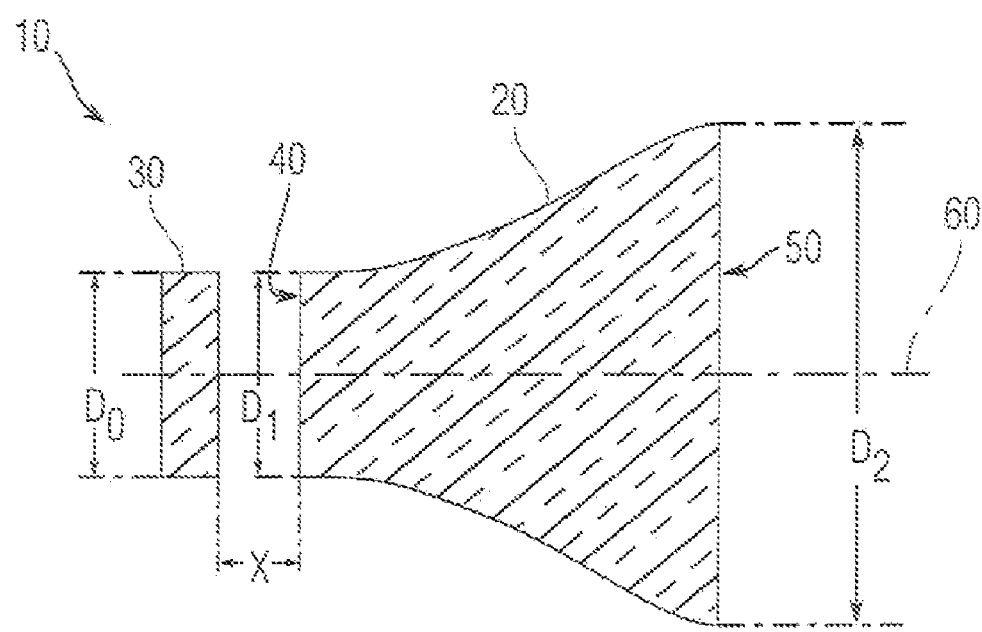
FIG. 2 is a cross-sectional side view of the optical system of FIG. 1.

Referring to FIGS. 1 and 2, an exemplary optical system 10 of the present teachings is shown. The optical system 10 can include (i) a waveguide 20 having a first end 40 and an opposing second end 50, and (ii) a whispering gallery mode (WGM) resonator 30 that is arranged in optical communication with the first end 40 of the waveguide 20 such that an evanescent field emitted from either one of the waveguide 20 or the resonator 30 can couple with one of the other waveguide 20 or resonator 30. The waveguide 20 includes an outer surface that is defined by a diameter that varies along a longitudinal axis 60 of the waveguide 20 from the first end 40 to the second end 50. Referring to FIG. 2, the first end 40 of the waveguide 20 can be defined by a first diameter $D_1$, and the second end 50 can be defined by a second diameter $D_2$, which is larger than the first diameter $D_1$.

As shown in FIG. 1, the varying diameter of the outer surface of the waveguide 20 can taper from the second end 50 to the first end 40 of the waveguide 20. According to various embodiments, the taper can be continuous from the second end 50 to the first end 40. The tapered shape of the waveguide 20 permits (i) the extraction of a Bessel beam generated by the resonator 30 into free space through second end 50 of the waveguide 20, and/or (ii) the coupling of a Bessel beam from free space into the waveguide 20 via second end 50 of the waveguide 20. The tapered shaped of the waveguide 20 permits the conservation of the angular (v) number and the frequency (k) of the wave of the Bessel beam. Moreover, the conservation of the angular (v) number and the frequency (k) of the wave results in an increase in a propagation constant ($\beta$) at the expense of a transverse momentum ($k_{v,q}$) as the diameter of the waveguide 20 expands from the first end 40 to the second end 50, while the opposite occurs as the waveguide 20 tapers from the second end 50 to the first end 40. Therefore, with respect to (i) above, the increase in the diameter of the waveguide 20 from the first end 40 to the second end 50 operates to alter the wave vector of the generated Bessel beam which allows the Bessel beam to escape from the second end 50 of the waveguide 20 into free space.

In one exemplary embodiment, the WGM resonator 30 of the optical system 10 of the present teachings is in a shape of a disk; however, the resonator 30 can be in any shape, such as, for example, a generally spheroidal shape. In an operative position, the resonator 30 and the waveguide 20 can be arranged in vicinity of one another such that the longitudinal axis of the resonator 30 is coaxial with the longitudinal axis of the waveguide 20. As shown in FIGS. 1 and 2, the waveguide 20 and the resonator 30 of the optical system 10 can be separated from one another by a separation distance, X. The separation distance, X, can be substantially fixed or, alternatively, can be varied by moving the waveguide 20 and/or the resonator 30 along their respective longitudinal axes. In one exemplary embodiment, the waveguide 20 and/or the resonator 30 can be moved such that they are placed in physical contact with one another. The magnitude of the separation distance, X, determines the loading of the resonator 30 and the ability of light to (i) propagate from the resonator 30 into the waveguide 20 when light is coupled with the resonator 20, or (ii) propagate from the waveguide 20 into the resonator 30 when light is coupled with the waveguide 20. As a result, by altering the separation distance, X, it is possible to tune the resonator loading and the amount of light propagation achieved between the waveguide 20 and the resonator 30.

As shown in FIGS. 1 and 2, the first end 40 and the second end 50 of the waveguide 20 define substantially circular cross-sections $D_1$, $D_2$, taken normal to the longitudinal axis 60. Moreover, the resonator 30 can also define a substantially circular cross-section $D_0$. In one exemplary embodiment, as shown in FIGS. 1 and 2, the diameter, $D_0$, of the resonator 30 and the diameter, $D_1$, of the first end 40 of the waveguide 20 can be substantially equal to one another. When the diameters, $D_0$ and $D_1$, are substantially equal to one another, it is possible to achieve critical coupling, whereby all of the photons with appropriate wave vectors propagate from the waveguide 20 into the resonator 30. In another exemplary embodiment, the diameters, $D_0$ and $D_1$ can be arranged to be unequal. The dimensions of the waveguide 20 and the resonator 30 of the present teachings are dependent upon the environment of use, manufacturing constraints, and the desired light altering characteristics to be achieved.

Figure 3:
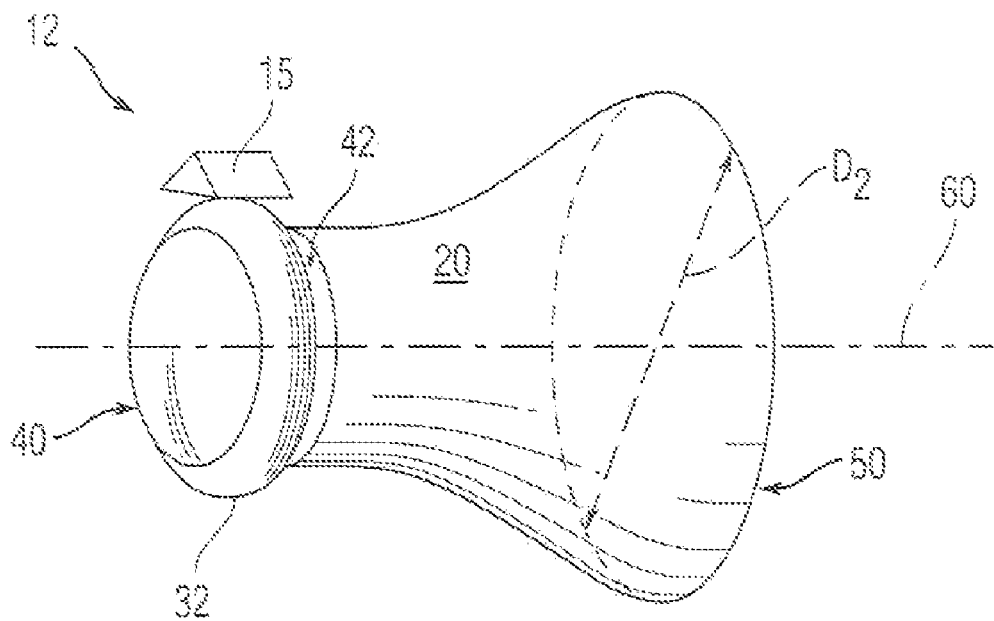
FIG. 3 is a perspective view of an optical device according to various embodiments.
Figure 4:
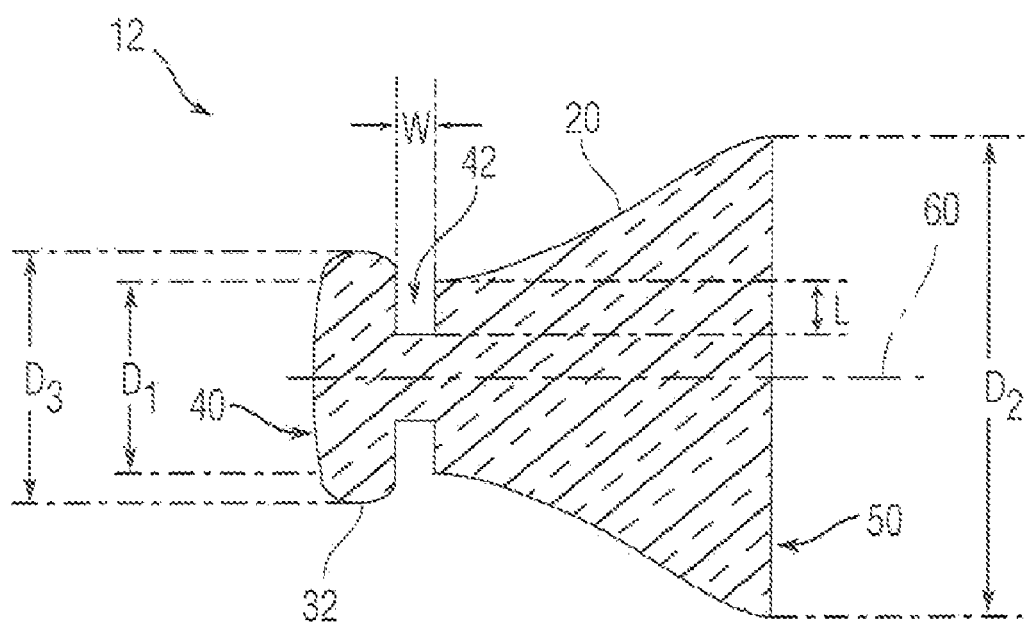
FIG. 4 is a cross-sectional side view of the optical device of FIG. 3.

Referring to FIGS. 3 and 4, an exemplary optical device 12 of the present teachings is shown and can be considered a low-contrast, WGM resonator. The low-contrast WGM resonator 12 can be a unitary, one-piece structure including a waveguide portion 20 and a ring-shaped resonator portion 32 that extends about the waveguide portion 20. For example, as shown in FIGS. 3 and 4, the waveguide portion 20 can includes a first end 40 defined by a first diameter $D_1$, and an opposing second end 50 defined by a second diameter, $D_2$. The waveguide portion 20 includes an outer surface that generally tapers from the second end 50 to the first end 40. According to various embodiments, the taper can be continuous from the second end 50 to the first end 40. The ring-shaped resonator portion 32 can extend about the first end 40 of the waveguide portion 20. The structure of the ring-shaped resonator portion 32 of the optical device 12 of the present teachings is distinguished from ordinary WGM resonators because its modes decay primarily into Bessel modes within the resonator portion 32 and not into free space. The ring-shaped resonator portion 32 also possesses its own localized whispering gallery modes. As shown in FIGS. 3 and 4, the optical device 12 of the present teachings can include an annular channel 42 formed intermediate of the first end 40 and the second end 50 of the waveguide portion 20.

As shown in FIGS. 3 and 4, the first end 40 and the second end 50 of the waveguide 20 define substantially circular cross-sections $D_1$, $D_2$, taken normal to the longitudinal axis 60. Moreover, as shown in FIG. 4, the ring-shaped resonator portion 32 is formed about the circumference of the first end 40 of the waveguide portion 20 and is defined by an outer diameter $D_3$ that is larger than the diameter $D_1$. As shown in FIG. 4, the annular channel 42 can be defined by a depth, L, and a width, W. Accordingly, in the optical device 12 of FIGS. 3 and 4, the resonator portion 32 and the waveguide portion 20 can form a unitary, one-piece optical structure. The width, W, and depth, L, of the annular channel 42 can be sized such that an evanescent field emitted from the ring-shaped resonator portion 32 is formed in the annular channel 42 and transmitted into the waveguide portion 20 in an area about the annular channel 42. The size and shape of the waveguide portion 20, ring-shaped resonator portion 32, and the annular channel 42, are dependent upon the desired mode of the resonator portion 32 and the type and quality of material used to fabricate the optical device 12.

Figure 5:
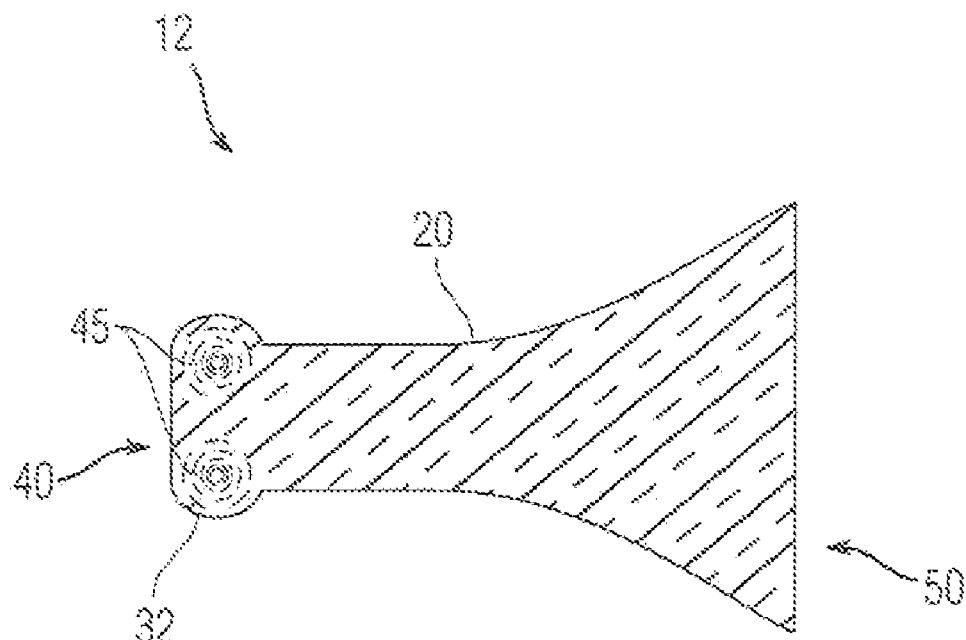
FIG. 5 is a cross-sectional side view of an optical device of the present teachings having a ring-shaped resonator formed around a longitudinal axis of a waveguide.

Referring to FIG. 5, a cross-sectional side view of another exemplary embodiment of the optical device 12 of the present teachings is shown. FIG. 5 is similar to FIG. 4 with the exception that the annular channel 42 shown in FIG. 4 is not provided. Accordingly, in the optical device 12 of FIG. 5, an evanescent field 45 emitted from the ring-shaped resonator portion 32 forms in an interior area at the first end 40 of the waveguide portion 20 and generally radially inwardly from the ring-shaped resonator portion 32.

Figure 6:
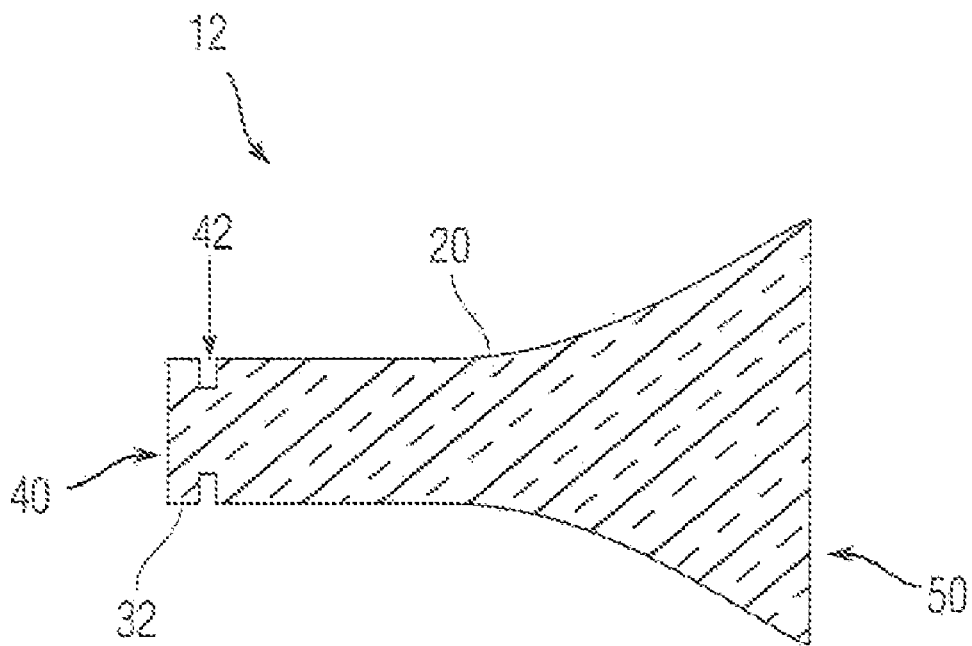
FIG. 6 is a cross-sectional side view of an optical device of the present teachings including an annular channel formed around a longitudinal axis of a waveguide.

Referring to FIG. 6, a cross-section of yet another exemplary embodiment of the optical device 12 of the present teachings is shown. According to FIG. 6, an annular channel 42 is formed a predetermined distance from the first end 40 of the optical device 12. In this exemplary embodiment, the formation of the annular channel 42 causes the area in the vicinity of the first end 40 of the waveguide portion 20 to act as a WGM resonator 32.

The optical system and device of the present teachings can be made from an optically transparent, electro-optic material. In an exemplary embodiment, the composition of the resonator 30, 32 and/or the waveguide 20 can include lithium niobate ($LiNbO_3$), lithium tantalate ($LiTaO_3$), sapphire ($Al_2O_3$), silica ($SiO_2$) and/or calcium fluoride ($CaF_2$). Preferably, the composition of the components can include $CaF_2$ or $SiO_2$ and, more preferably, can be made substantially entirely from $CaF_2$ or $SiO_2$.

According to various embodiments, a method of generating high-order Bessel beams in free space is provided. The method includes coupling light to a mode of a resonator 30, 32 of the present teachings to produce a high-order Bessel beam within the resonator 30, 32. As shown in FIGS. 1 and 3, this can be achieved by directing light into an optical coupler 15 arranged in the vicinity of the resonators 30, 32. Light is coupled into the resonators 30, 32 via an evanescent field emitted from the coupler 15. Coupling light into the resonators 30, 32 selectively excites a desired WGM of the resonators 30, 32. As discussed below, exciting particular modes of the resonators 30, 32 results in the generation and subsequent free space emission through the tapered waveguide 50 of the present teachings of a high-order Bessel beam including photons having a particular angular momentum.

The method further includes transferring the generated high-order Bessel beam into the first end 40 of the waveguide 20 by emitting an evanescent field generated by the Bessel beam. For example, referring to the optical device 12 of FIG. 5, an evanescent field 45 emitted from the resonator portion 32 can be formed in an interior of the first end 40 of the waveguide portion 20. Alternatively, in an optical device 12 including a separation distance, X, or having an annular channel 42, as shown in FIGS. 1, 2, and FIGS. 3, 4, 6, respectively, an evanescent field generated by the Bessel beam can be formed in the area of the separation or in the annular channel 42. The free space emission of the Bessel beam is accomplished by extracting the high-order Bessel beam from the second end 50 of the waveguide 20. This occurs as a result of the tapered shape of the waveguide 20 of the present teachings which shape promotes the extraction of the generated Bessel beam into free space.

According to various embodiments, a method of determining orbital angular momentum of a photon is also provided. The method includes introducing an existing Bessel beam, including a plurality of photons having unknown characteristics, into the second end 50 of the waveguide 20 of the present teachings. The method also includes directing the Bessel beam from the second end 50 to the first end 40 of the waveguide 20 and emitting an evanescent field generated by the Bessel beam out from the first end 40 and into a resonator 30, 32. The method further includes determining the orbital angular momentum of at least one of the photons of the Bessel beam present in the evanescent field by ascertaining whether a frequency of the emitted evanescent field is supported by a mode of the resonator 30, 32. The waves of a Bessel beam experience a strong interaction with the modes of the resonator 30, 32 when the quantum numbers of waves in the waveguide 20 and in the resonator 30, 32 coincide. Hence, by observing WGMs, the angular momentum of a photon of the Bessel beam can be determined. Furthermore, the photon of the Bessel beam can be extracted from the mode of the resonator 30, 32 through the use of a coupler 15.

The optical device 12 of the present teachings can be made utilizing various machining technologies. For example, the optical device 12 can be made by securing a cylindrical rod onto a machining machine and turning the cylindrical rod about its longitudinal axis. A cutting tool can then be used to remove material from the cylindrical rod at predetermined locations along a longitudinal direction thereof. As a result, an optical device including a first end 40 defined by a first diameter, $D_1$, an opposing second end 50 defined by a second diameter, $D_2$, and an outer surface that is substantially continuously tapering from the second end 50 to the first end 40 can be formed. Optionally, the removal of the material from the cylindrical rot at pre-determined locations can result in the formation of a raised annular ring over the first end 40 and/or formation of an annular channel 42 between the first end 40 and the second end 50. According to various embodiments, the cutting tool can be a diamond tipped cutter. While the machined optical device 12 is still being turned, a polisher can be used to polish the surface of the finished surface of the optical device 12.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. An optical system comprising:
  a means for providing light possessing angular momentum, comprising:
    a waveguide including an outer surface defined by a diameter that varies along a longitudinal axis of the waveguide from a first end to an opposing second end, the first end of the waveguide defining a first diameter and the second end defining a second diameter which is larger than the first diameter; and a resonator arranged in optical communication with the first end of the waveguide such that an evanescent field emitted from one of the waveguide and the resonator is capable of being coupled into one of the other resonator and waveguide wherein propogation of the light comprises a spiral pattern.

2. The optical system of claim 1, wherein the varying diameter of the outer surface of the waveguide continuously tapers from the second end to the first end of the waveguide.

3. The optical system of claim 1, wherein the waveguide and the resonator are made from an optically transparent material.

4. The optical system of claim 3, wherein the optically transparent material is silica, calcium fluoride, or a combination thereof.

5. The optical system of claim 1, wherein the resonator is in one of a disk shape and a spheroidal shape.

6. The optical system of claim 1, wherein the resonator is spaced from the waveguide via a separation distance such that the resonator is not in physical contact with the waveguide.

7. The optical system of claim 6, wherein the separation distance between the resonator and the first end of the waveguide is capable of being varied.

8. The optical system of claim 1, wherein the resonator defines a diameter which is larger than the first diameter of the waveguide.

9. The optical system of claim 1, wherein the resonator and the waveguide form a unitary structure.

10. An optical device comprising:

a means for providing light possessing angular momentum, comprising:

a waveguide portion including a first end defined by a first diameter, an opposing second end defined by a second diameter, and an outer surface substantially continuously tapering from the second end to the first end, and a whispering gallery mode resonator portion formed about the first end of the waveguide portion, such that the waveguide portion and the whispering gallery mode resonator portion form a unitary, one-piece optical waveguide structure wherein propogation of the light comprises a spiral pattern.

11. The optical device of claim 10, wherein the optical device is made of an optically transparent material.

12. The optical device of claim 11, wherein the optically transparent material is silica, calcium fluoride, or a combination thereof.

13. The optical device of claims 10, further comprising an annular channel formed at a predetermined distance from the first end of the waveguide portion.

14. The optical device of claim 13, wherein the waveguide portion and the whispering gallery mode resonator portion are arranged such that an evanescent field is capable of being formed in a vicinity of the annular channel when light is coupled to either one of the waveguide portion and the whispering gallery mode resonator portion.

15. The optical device of claim 10, wherein the waveguide portion and the whispering gallery mode resonator portion are arranged such that an evanescent field is capable of being formed in an interior of the first end of the waveguide portion when light is coupled to either one of the waveguide portion and the whispering gallery mode resonator portion.

16. A method of generating high-order Bessel beams in free space comprising:

providing a waveguide including a first end defined by a first diameter, an opposing second end defined by a second diameter, and an outer surface tapering from the second end to the first end;

providing a whispering gallery mode resonator arranged at the first end of the waveguide;

coupling light to a mode of the whispering gallery mode resonator to produce a high-order Bessel beam in the whispering gallery mode resonator;

transferring the high-order Bessel beam into the first end of the waveguide by emitting an evanescent field from the resonator; and extracting the high-order Bessel beam from the second end of the waveguide.

17. The method of claim 16, wherein providing the whispering gallery mode resonator includes forming the whispering gallery mode resonator around the first end of the waveguide such that the waveguide and the whispering gallery mode resonator form a unitary optical waveguide structure.

18. A method of determining orbital angular momentum of a photon comprising:

providing a waveguide including a first end defined by a first diameter, an opposing second end defined by a second diameter, and an outer surface tapering from the second end to the first end;

providing a whispering gallery mode resonator arranged at the first end of the waveguide;

introducing an existing Bessel beam including a plurality of photons having unknown characteristics into the second end of the waveguide;

directing the Bessel beam from the second end of the waveguide to the first end of the waveguide;

emitting an evanescent field generated by the Bessel beam from the first end of the waveguide and into the whispering gallery mode resonator wherein the Bessel beam possesses angular momentum produced by propagation of the Bessel beam in a spiral pattern; and determining the orbital angular momentum of at least one of the photons of the Bessel beam present in the evanescent field by ascertaining whether a frequency of the emitted evanescent field is supported by a mode of the whispering gallery mode resonator.

* * * * *